UNITED STATES PATENT OFFICE.

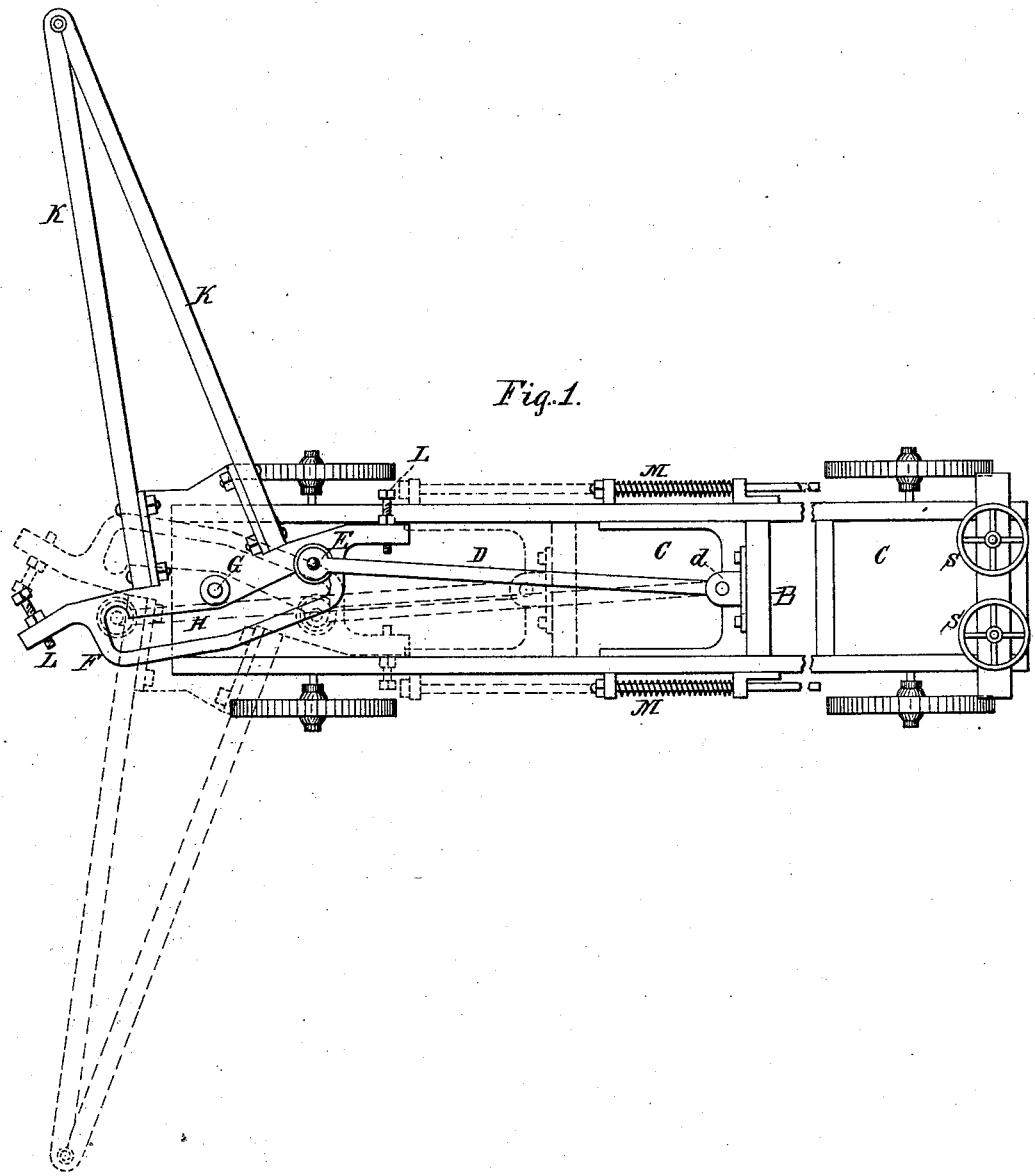

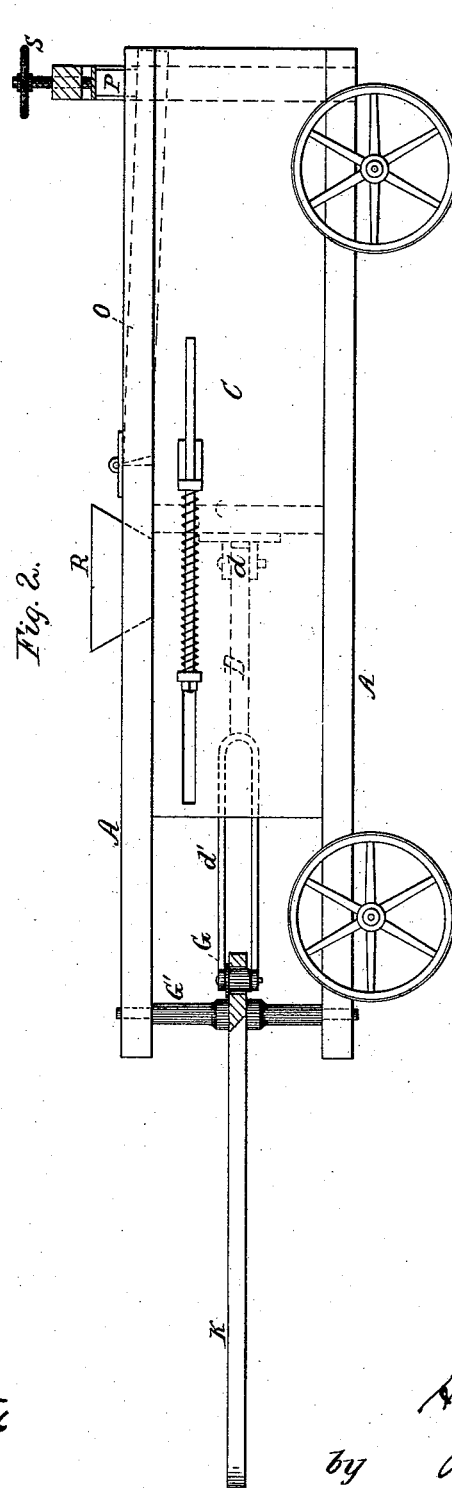

HARVEY R. WOLFE, OF LOUISVILLE, KENTUCKY, ASSIGNOR OF ONE-HALF TO BRENNAN & CO. SOUTHWESTERN AGRICULTURAL WORKS, OF SAME PLACE.

BALING-PRESS.

SPECIFICATION forming part of Letters Patent No. 381,975, dated May 1, 1888.

Application filed January 22, 1887. Serial No. 225,056. (No model.)

*To all whom it may concern:*

Be it known that I, HARVEY R. WOLFE, of Louisville, in the State of Kentucky, have invented certain new and useful Improvements in Baling-Presses, of which the following is a full and complete specification.

My invention relates to baling-presses, the novel features of which will be more fully set forth hereinafter.

In the accompanying drawings, forming part of the specification, Figure 1 is a top plan view of the press. Fig. 2 is a side elevation.

A A are the top and bottom portions of the frame of the press, supported on wheels for transporting it from place to place. B is a plunger moving in the chamber C. This plunger is controlled by the pitman D, which is pivoted to the rear side of the plunger at d. The opposite end of the pitman is forked, as shown at d', Fig. 2. The bifurcations of this pitman embrace and are pivoted to the roller E. At the forward end of the frame is a slotted cam, F, pivoted at G by the spindle G', Fig. 2. The slot H may be slightly curved or angular in shape and wide enough to permit the roller E, attached to the pitman, to move freely throughout its length. At each end of the slot is a depression or bearing to receive and hold the roller E. These two bearings and the pivotal point G are in a line, or nearly so. Attached to this cam is an arm or lever, K, by which the cam is swung or rotated on its axis by power.

L L are set-screws in wings of the cam, and can be adjusted so that as the cam is swung round past a certain point the end of the set-screw will strike the pitman and throw the roller E out of its bearing and leave it free to move to the other end of the slot. Springs M M are arranged on the outside of the frame, so as to draw the plunger and pitman backward as soon as the roller is released by being thrown out of the bearing or catch in the slot. The roller at once passes to the opposite end of the slot. Then, by swinging the lever and cam round to the position indicated by dotted lines, the pitman and plunger are forced forward in the chamber C, compressing the hay or other contents. The set-screws having been properly adjusted, the moment the plunger has been forced into the proper point the roller E is released and the springs M M force the plunger back into position for a new stroke.

The chamber C may be provided with a permanent or removable head, against which the contents are pressed; or after the first bale has been pressed it may be used as a head against which the second is pressed, in which case the chamber is made sufficiently long to hold two bales. I then provide a hinged lid or top, O, which fits into the chamber, making it smaller at the end and somewhat funnel-shaped. The outer end of this hinged portion is held in by an elastic pressure, produced by springs or blocks of rubber, as shown at P, Fig. 2. This rubber spring is regulated by the set-screw S. As the bale is forced toward and through the smaller end of the chamber, it is still more compressed and affords a yielding resistance or head for the fresh bale being pressed, and is finally pushed out.

R is a hopper or receiver for introducing the hay into the press.

I am aware that it is old in hay-presses to provide a sweep having a transverse slot in which a roller moves and is connected by links and toggle-bars to the plunger, and I do not claim, broadly, such a construction.

I am also aware that it is not new to construct a baling-press with the rear end of the pressing-chamber with a hinged portion for contracting the end, said hinged portion being operated or held in place by set-screws or the like, and I do not claim such a construction broadly.

Having described my invention, what I claim, and desire to secure by Letters Patent, is—

1. In a baling-press, the combination of a slotted reversible cam provided with set-screws, a roller moving in the slot, and a pitman pivoted to said roller, whereby as the cam is rotated the pitman forces the plunger into the pressing-chamber and the set-screws release the roller at any desired point to permit it to move to the other end of the slot in the cam for a new stroke, substantially as and for the purpose described.

2. In a portable baling-press, a slotted cam angular in shape and provided with depressions at the ends, and carrying set-screws, in combination with a roller in the cam-slot, a pitman, and springs to force the roller when released to the opposite end of the cam-slot.

HARVEY R. WOLFE.

Witnesses:
R. B. MOORE,
J. SPEED PEAY.